(12) United States Patent
Pickering et al.

(10) Patent No.: US 8,139,753 B2
(45) Date of Patent: Mar. 20, 2012

(54) METHOD AND APPARATUS FOR HANDLING A TELEPHONE CALL

(76) Inventors: Richard Pickering, Whitchurch (GB);
Ashley Unitt, Whitchurch (GB);
Jonathan Grant, Whitchurch (GB);
Anthony Buxton, Whitchurch (GB)

( * ) Notice: Subject to any disclaimer, the term of this patent is extended or adjusted under 35 U.S.C. 154(b) by 1005 days.

(21) Appl. No.: 11/942,279

(22) Filed: Nov. 19, 2007

(65) Prior Publication Data
US 2009/0116636 A1    May 7, 2009

Related U.S. Application Data

(60) Provisional application No. 60/860,450, filed on Nov. 20, 2006.

(51) Int. Cl.
*H04M 5/10*    (2006.01)
(52) U.S. Cl. ......... 379/265.02; 379/110.01; 379/218.01; 379/265.14; 379/88.19
(58) Field of Classification Search ............. 379/265.02, 379/110.01, 218.01, 265.14, 88.19; 705/14.53
See application file for complete search history.

(56) References Cited

U.S. PATENT DOCUMENTS

| | | | | |
|---|---|---|---|---|
| 5,873,068 A | * | 2/1999 | Beaumont et al. | 705/14.53 |
| 6,373,836 B1 | * | 4/2002 | Deryugin et al. | 370/352 |
| 6,560,328 B1 | * | 5/2003 | Bondarenko et al. | 379/265.02 |
| 6,882,641 B1 | * | 4/2005 | Gallick et al. | 370/356 |
| 2001/0014145 A1 | * | 8/2001 | Kamel et al. | 379/88.19 |
| 2003/0103617 A1 | * | 6/2003 | Brown et al. | 379/265.02 |
| 2003/0123627 A1 | * | 7/2003 | Pinard et al. | 379/110.01 |
| 2003/0198337 A1 | * | 10/2003 | Lenard | 379/265.14 |
| 2004/0062380 A1 | * | 4/2004 | Delaney | 379/265.02 |
| 2004/0109555 A1 | * | 6/2004 | Williams | 379/265.02 |
| 2007/0025542 A1 | * | 2/2007 | Bushey | 379/265.02 |
| 2007/0116239 A1 | * | 5/2007 | Jacobi et al. | 379/265.02 |
| 2007/0121880 A1 | * | 5/2007 | Stillman et al. | 379/218.01 |
| 2007/0121882 A1 | * | 5/2007 | Timmins et al. | 379/218.01 |

* cited by examiner

*Primary Examiner* — Joseph J Nguyen

(57) ABSTRACT

One embodiment of the invention provides a method of handling a telephone call. The method includes providing a multi-tenanted computer-telephony integration (CTI) server. The different tenants correspond to various outlets for one or more product or service offerings. The CTI server is located outside the customer premises for the various outlets. The method further includes receiving a call directed to one of the outlets and using CLI for the call by the CTI server to identify the calling party and a customer profile for the calling party. The customer profile is based on previous orders. The method further includes queuing the call within the network if it is determined that the outlet is unable to currently service the call, and forwarding the call to the outlet to process the call. The CTI server uses the customer profile for providing priority call handling treatment for loyal customers.

13 Claims, 2 Drawing Sheets

METHOD AND APPARATUS FOR HANDLING A TELEPHONE CALL

RELATED APPLICATION

This application hereby claims priority under 35 U.S.C. §119 to U.S. Provisional Patent Application No. 60/860,450 filed 20 Nov. 2006, entitled "METHOD AND APPARATUS FOR HANDLING A TELEPHONE CALL," by inventors Richard Pickering, Ashley Unitt, Jonathan Grant and Anthony Buxton.

FIELD OF THE INVENTION

The invention relates to a method and apparatus for handling a telephone call, especially for use in the context of a fast food delivery service and other similar businesses.

BACKGROUND OF THE INVENTION

It is very common for customers to order a product over the telephone. One particular industry where this is a very widespread activity is for home delivery of fast food, for example pizzas. The characteristics of this business place significant constraints on the handling of customer calls. Thus frequently there is no pre-existing arrangement (e.g. a contract) that ties the customer to any given pizza delivery outlet. Rather, the customer will telephone one establishment, but if their call is not handled swiftly, they may then telephone another rival establishment. If they receive good service from this rival establishment, they may call the rival first next time they need a pizza. In other words, there is high customer mobility between competing businesses, and accordingly customer service standards have to be very high to retain customers. This particular applies to the handling of incoming telephone calls, which represent the first point of contact with the customer (when it is easiest for the customer to retract and go elsewhere). Existing systems generally do not provide a mechanism to reward and retain loyal customers.

Another problem is that the call rate into pizza delivery outlets may be highly bunched. For example, if there is a popular event on television, there may be a sharp peak in calls immediately before or after the event, or during an interval (e.g. an advertising break). These variations in incoming call rate exacerbate the problem of providing a good telephone service to all customers.

A further consideration is that most pizza delivery establishments are small businesses. They cannot afford large-scale call handling facilities, either in terms of the infrastructure, or the staff to run them.

It is also common for such pizza establishments to be franchise operations. The franchisor would like customers to experience a common customer interface irrespective of which franchisee they contact in order to build brand value for the franchise, but this is difficult with multiple franchisees each operating a highly local service. There is also a concern amongst franchisors that some franchisees might hide part of their business from the franchisor (in order to avoid royalty payments).

Accordingly, there are significant challenges in providing a good telephone service for pizza delivery outlets and other such businesses.

SUMMARY OF THE INVENTION

One embodiment of the invention provides a method of handling a telephone call. The method includes providing a multi-tenanted computer-telephony integration (CTI) server. The different tenants correspond to various outlets for one or more product or service offerings. The CTI server is located outside the customer premises for the various outlets. The method further includes receiving a call directed to one of the outlets and using CLI for the call by the CTI server to identify the calling party and a customer profile for the calling party. The customer profile is based on previous orders. The method further includes queuing the call within the network if it is determined that the outlet is unable to currently service the call, and forwarding the call to the outlet to process the call. The CTI server uses the customer profile for providing priority call handling treatment for loyal customers. Such a method may be used in a fast food delivery business such as pizza ordering or in any other appropriate business.

In one embodiment, the customer profile is used to provide a marketing message dependent on the customer profile. The marketing message may also be dependent on real-time information from an external source, for example weather data, current product availability, etc. The marketing message may also be dependent on the time spent in the queue. In one embodiment, the outlet is informed of the marketing message heard by the caller. For example, this enables the outlet to hear if the caller has heard about a particular promotion.

In one embodiment, the priority call handling treatment includes accelerating the progress of the call through a queue of calls. Therefore customers who are loyal have their calls answered relatively early.

In one embodiment, the CTI server bridges the call with a call placed from the CTI server to an outlet. In other words, there is a first call arriving from the caller at the CTI server, and a second call from the CTI server to the pizza outlet (or other call handling facility). The first and second calls are bridged so that the existence of two separate calls is transparent to the caller. However, because the CTI server retains a presence in the two calls, it can collect call statistics, record the call, etc. The call recording may be performed by the CTI server itself or some device under the control of the CTI server, such as an IVR.

In one embodiment, automated order status is provided to repeat callers (since they are frequently calling about order status). This frees up human agents to take calls for new orders. In one embodiment, the method further comprises maintaining a call history database, and comparing the CLI with the call history database to identify a repeat caller.

In one embodiment, the method further comprises maintaining a local copy at the CTI server of customer profile data and accessing remote order data and/or product availability data for handling the call. Having the local copy at the CTI server of the customer profile data allows the CTI server to generally have a quicker response time for call processing. However order data and/or product availability data are generally stored at the various outlets themselves, since these change more frequently than customer profile data (and so would be harder to mirror in the network).

In one embodiment, the CTI server collects aggregate statistics for calls to all the various outlets. These aggregated statistics can be made available for management purposes, for example to a franchisor, where the various outlets are franchise operations of the franchisor.

Other embodiments of the invention provide a computer program and apparatus for implementing a method such as described above. The computer program may be provided as machine executable instructions on a computer readable medium.

BRIEF DESCRIPTION OF THE DRAWINGS

Various embodiments of the invention will now be described in detail by way of example only with reference to the following drawings.

DETAILED DESCRIPTION

Figure 1:
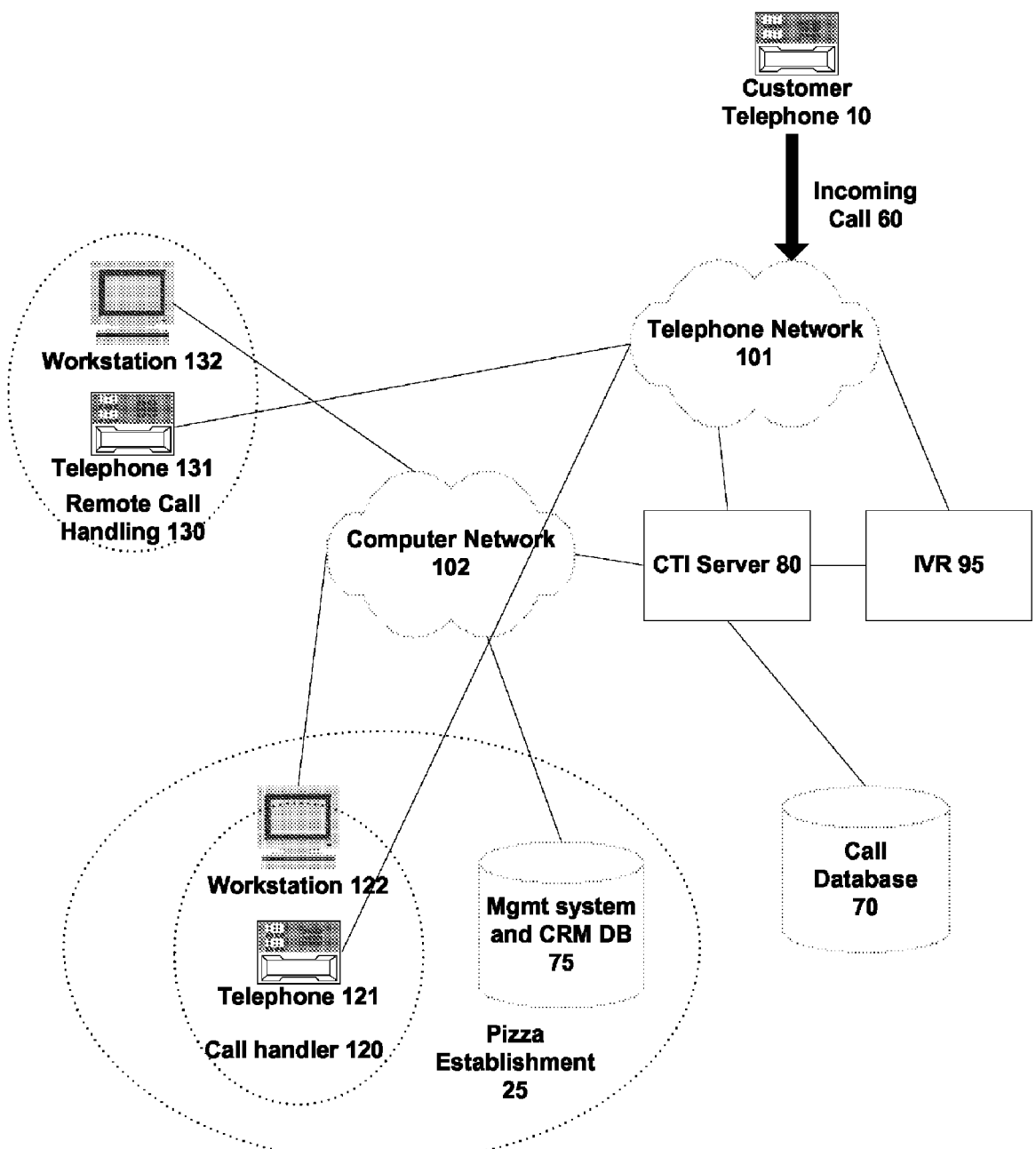
FIG. 1 is a schematic diagram of a CTI system in accordance with one embodiment of the invention.

FIG. 1 is an illustration of a computer-telephony integration (CTI) system in accordance with one embodiment of the invention. A customer 10 makes a call 60 to a pizza establishment 25. The pizza establishment may be part of a chain. There may be a single shared number for all venues in the chain. However, in many cases the pizza place 25 will have its own geographic telephone number, in order to emphasise proximity to the customer 10.

The call is intercepted within the telephone network 101 by a CTI server 80 based on the dialed number. The calling number (CLI/ANI) is generally presented to the CTI server 80 by the network. In some embodiments, an interactive voice response (IVR) unit 95 is also provided. The CTI server 80 may use the IVR to obtain the CLI (if this is not presented by the network), and/or to obtain additional information from the caller, for example an account number or such like.

The CTI server 80 can answer the call (either directly or indirectly or with the IVR 95) and play an announcement to the caller. This announcement can be generic across a franchise operation in order to ensure branding consistency, but may also be customisable according to the requirements of the particular establishment to which the call is directed. For example, there may be a franchise-wide promotion of free garlic bread with an order above a certain value. All callers may be played the relevant marketing message about this promotion. However, if the management system at a particular establishment detects that the venue has run out of garlic bread, it can notify the CTI server 80, which can then stop playing the marketing message in relation to that promotion to callers for that particular venue.

Information about all incoming calls is stored into call database 70 (and may subsequently be downloaded into the management systems of the relevant pizza establishments). The call database is network-based, in other words, located away from the customer premises 25. In one implementation, the call database 70 may be co-located with the CTI server. Note that call database 70 may be implemented by one or more physical databases as appropriate.

The call database allows the CTI server to see if the CLI for a new call matches the CLI for a call recently received. In this case, there is a high likelihood that the caller is inquiring about the delivery status of an earlier order. Therefore, the CTI server 80 can interrogate the mgmt system 75 of the relevant pizza delivery establishment to determine order status. The CTI server 80 can then relay the relevant information to the caller: e.g. "your order has been dispatched with the delivery rider and should be delivered within the next 10 minutes". The caller may then be asked if any further service is required. This automated detection of recent callers allows calls that have a high probability of not representing new orders to be handled automatically without involving a human agent.

The CTI server 80 may also access information associated with the caller from the CRM database 75 of the relevant pizza establishment. The information may be accessed based e.g. on the calling number or perhaps account number of the caller. If the system does not recognise the calling number, it may use the IVR to ask the customer if they have previously dealt with the establishment. If not, then no CRM data will be available (but may now potentially be first collected at this point). However, if the caller is an established customer, the caller may be prompted to enter more information to allow the system to locate their CRM data. For example, the caller may be asked to enter an alternative phone number, e.g. a home phone number if the caller is calling from work.

In one embodiment, the information in CRM database 75 is processed to provide a customer profile. The customer profile might reflect information such as the overall value of the customer, participation in special promotions etc. The CTI server 80 may then use the customer profile (rather than the raw CRM data) for handling the call. This allows the application running on the CTI server to avoid accessing and processing all the raw CRM data, which may be relatively time-consuming for real-time call handling.

In one embodiment, a copy of the CRM data is uploaded from database 75 to the CTI server 85. This upload may be performed on a regular basis, for example daily or weekly. In some cases the CRM upload may not be a fully structured database, but may have a simpler file structure having a standardised data format, such as a spreadsheet (in which case CRM database 75 may be implemented by a spreadsheet file). For example, the spreadsheet may comprise a set of telephone numbers and a customer profile for each telephone number.

Having a copy of the CRM data (in whatever format) local to CTI server 80 provides faster response times for real-time call handling. In general however, the CTI server 80 goes across the network to management system 75 when checking order information and such-like (as described above). This is because order information and other such data are updated frequently at a pizza establishment 25 (and so it is more difficult and involves more network traffic to maintain a fully up-to-date copy at the CTI server 80).

The customer information (whether a profile or some other form of CRM data) may be used to determine, for example, whether the customer is a high value customer based on previous orders. This may lead to the call being given high priority for being passed through to a live agent. The system may also detect whether the caller always makes the same order. In this case, the system might prompt the caller with their standard order, and ask if they want to repeat that order.

Note that CTI server 80 has a much larger capacity for incoming calls than any single pizza establishment. Consequently, callers avoid getting an engaged tone, but rather can be entered into a queue, and played appropriate marketing or informational messages as suggested above. Callers can also be offered incentives to stay in the queue—for example, money off if they are queued for more than a certain period. (This period might be adjusted in accordance with current queue length and overall call volume).

The CTI server 80 also has the capacity to record calls and to collect call statistics. This is attractive to the franchisor. For example, if a particular establishment reports low sales, the franchisor can see whether the low sales are due to a low number of customer contacts or to a poor completion rate for calls. If the latter, the recordings of various calls can be used to investigate the poor completion rate. This information can then help improve the business performance of the relevant venue (or identify any fraud).

Assuming that the incoming call 60 is not a repeat call (e.g. no call has been received from that caller within the last hour say), the CTI server attempts to forward the call to the desired pizza establishment (in accordance with the dialed number). If the establishment is already busy handling calls, the CTI server may queue the call. Another possibility is to overflow the call to a separate call handling facility 130 (i.e. different from pizza establishment 25). Such an overflow operation may be performed immediately, or only after the customer has been held in the queue for a certain time period (which may be dependent upon the customer profile—e.g. high priority customers might be overflowed more promptly).

In one embodiment, call handling facility 130 comprises a call centre 130, which may serve multiple pizza establishments, thereby helping to smooth out variations in call rate on a statistical basis. Such a call centre may also serve other businesses, not just pizza delivery. This allows most efficient use of telephone operatives. A further possibility is to overflow calls to other employees of the pizza firm, for example admin employees who are now at home. These employees may be paid on a stand-by basis as home-workers to provide an overflow capacity. Note that in some cases, a pizza establishment may outsource all incoming calls to a call centre (rather than having any staff in pizza establishment 25 for this role). This then allows the staff at the pizza delivery venue to concentrate on order fulfillment.

In one embodiment, the CTI server detects if a customer abandons a call before being connected with an agent. The CTI server may then select to call the customer back directly (based on the CLI) and connect the caller immediately to a live agent.

In general the CTI server 80 sets up a separate call to the agent who is to handle the call (whether at the pizza establishment 25, at a separate call handling facility 130, or elsewhere). This call is then bridged with the original incoming call 60 from the customer to allow the customer to talk to the agent. Note that since the CTI server 80 is still involved in the call (rather than linking the customer directly to the agent and then dropping out altogether), the CTI server can collect call statistics, perform call recording, etc.

When the CTI server 80 forwards the call to an agent, it can also provide information associated with the call to a workstation screen associated with the agent (e.g. workstation 122 for a call to telephone 121 or to workstation 132 for a call to telephone 131). Note that this may occur even if the call is being directed to a homeworker (provided that the homeworker has the facility for separate incoming voice and data, such as broadband or some other suitable Internet connection).

The information provided to the agent receiving the call can lead to better and quicker handling of the call. For example, based on the CLI information, the customer delivery address may be retrieved from a customer database 75. The agent then only needs to confirm the address with the caller (rather than having to enter a new address). The agent may also be presented with other information about the caller from the CRM database 75, such as that the customer should have priority treatment for being a regular and/or high value customer, etc.

The agent may also provide a caller with customer specific offers (as prompted by the application running on CTI server 80). These may be based on customer information stored in CRM database 75. For example, if a particular customer always orders medium size pizzas, they may be offered a special trial deal to upgrade to a larger size. Another possibility is that the offer depends on the call experience of the caller. For example, if the system indicates that the caller has been queuing for several minutes, the agent might be prompted to offer the customer free garlic bread as compensation for this delay.

After the agent takes an order, this is entered via the user workstation 122, 132 into the management system 75. This is used by the pizza establishment to manage and track orders. Information from the management system can also be provided to agents handling calls, for example in relation to current queue times. Another possibility is to notify agents if certain products (e.g. pizza toppings) run out, so that the customer can be offered a suitable alternative.

In one embodiment, the CTI server and associated databases are multi-tenanted, in that the same hardware is shared by multiple different organisations (such as different pizza establishments). Each establishment has access to its own data regarding call statistics and so on. A managing entity (e.g. a franchisor or head office for a group of outlets) may be provided with access to aggregate data for all the different tenants. It will be appreciated that this collective approach allows the cost of more advanced facilities (such as call recording and/or voice recognition) to be shared across a number of establishments.

Figure 2:
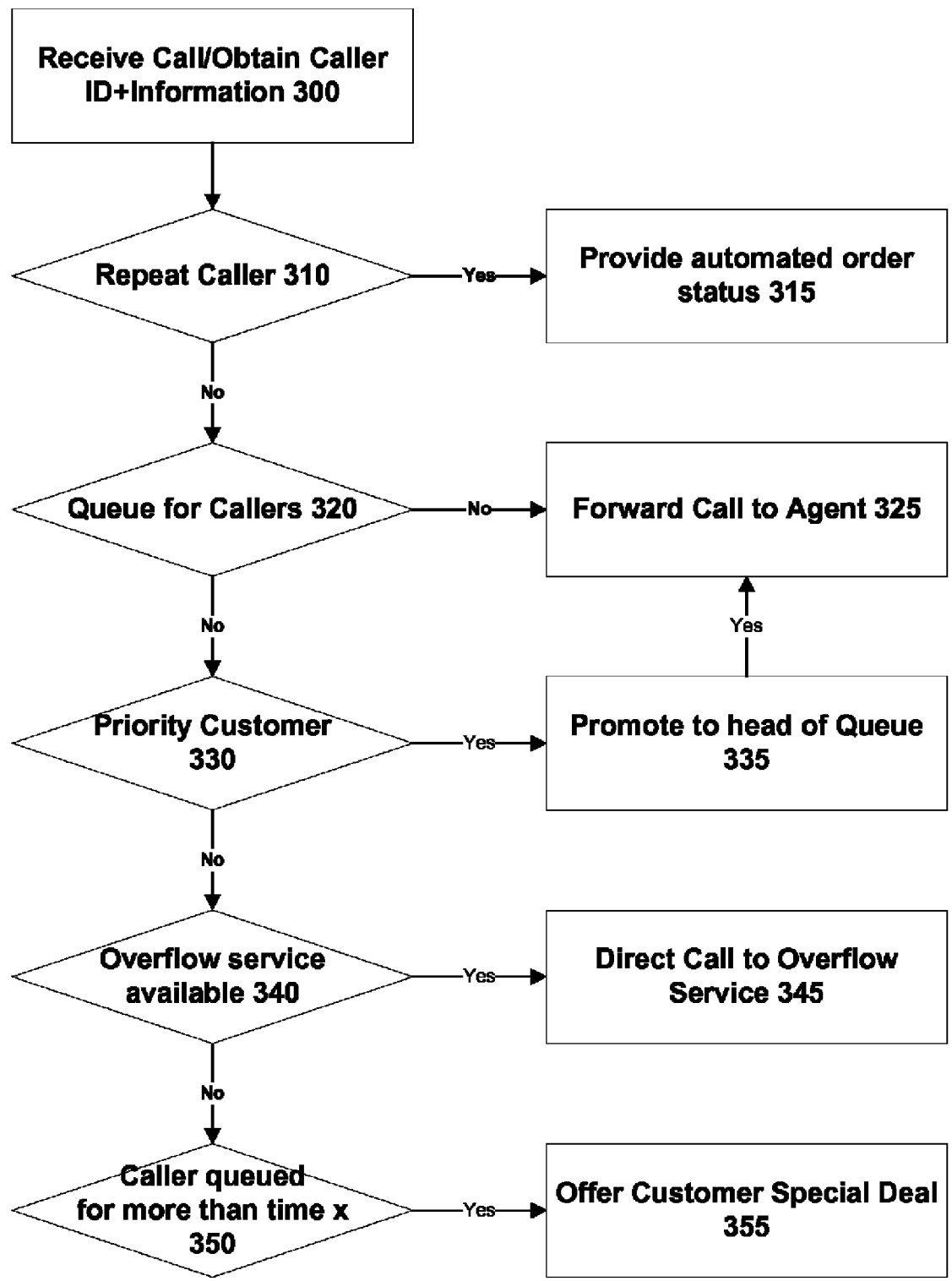
FIG. 2 is a schematic flowchart of call handling for a pizza delivery service in accordance with one embodiment of the invention.

FIG. 2 illustrates a method for handling a call in accordance with one embodiment of the invention such as described above. This method may be implemented using the computer telephony system shown in FIG. 1 or any other appropriate system. It will be appreciated that many variations are possible on the methodology of FIG. 2.

The method commences with receiving an incoming call from a caller and obtaining caller identification. The caller identification may, for example, comprise a calling line identifier (CLI), also known as automatic number identification (ANI). Another possibility is that an IVR system is used to obtain information identifying the caller, such as an account number.

The caller identification can be used to access information about the caller. If the caller is a repeat caller, then he/she may be played automated information about the status of their current order. In addition, an account number or a telephone number may be used to identify a customer record in a customer relationship management database. Once the appropriate customer record has been identified, the system can now retrieve information (e.g. a profile) from this record for the customer making the call.

The system now determines how to act based on the caller information. One possibility is that the caller may be played a message comprising marketing information of specific relevance to the caller (not shown in FIG. 2). For example, the marketing message may indicate that a product that the customer has previously purchased is currently on special offer. The CRM information may also be used to identify priority customers who can then be routed to the head of the call handling queue.

If the caller is still in the queue, the caller may be routed to an overflow call handling facility (e.g. a call centre, and/or homeworkers).

In some implementations, the information provided onto the screen 122 of an agent 120 who eventually receives the call may include an indication or details of any caller-specific marketing message played to the caller. For example, if the caller has been played a marketing message about a particular promotion, the CTI system may prompt (script) the agent to ask the caller if they are interested in pursuing the offer that they have just heard. Another possibility is that the agent is provided with data indicating which caller-specific marketing message was played to the caller, so that the agent will be aware of the situation in case the caller asks about a product or service described in the marketing message. If the caller is further delayed in the queue, the agent may be instructed to provide the caller with some special offer as compensation.

It can be seen therefore that call handling can be based on:
a) customer data—e.g. a customer profile; and/or
b) call data—e.g. whether the caller has recently called or has been in the queue for a long time.

The system described above may have the following functionality:

CLI capture—if CLI is not presented, the call is intercepted and the caller asked to input their telephone number. Likewise, if the CLI is not recognised, the caller may be asked to input an alternative telephone number (e.g. a home number if they are calling from work or a mobile). The entered number is then provided as CLI when the call is transferred to a pizza shop. This allows near 100% screen popping plus other relevant functionality.

VIP caller treatment. VIP callers recognized by their CLI are placed at the front of the queue, ensuring a superb customer service for the most loyal customers.

no engaged tone—usually a shop can only take as many calls as they have inbound telephone channels. Thus if they have 5 channels, the $6^{th}$ caller gets the busy tone. The present system queues callers in the network so they do not receive the busy tone.

queue positions and expected wait times can be announced to callers.

automated call-back can be provided, such that if a caller hangs up while in the queue (and CLI is available), the system calls the caller back immediately for connection to the first live agent.

the system operates as a virtual call centre providing (a) call statistics such as abandon rates, time to abandon etc (b) overflow, e.g. to homeworkers with a broadband connection.

call recording allows the best practice of best performing order takers to be analysed and spread, and protects against fraud.

the system provides automated status updates for a caller who has recently placed an order, so that they are given an order status update with the option to hold for the shop.

average order value can be increased using relevant marketing, e.g. enabling shops to make specific offers to individual customers, based on a) individual customer history (e.g. upsell to large for callers who normally only buy medium), b) customer profile (e.g. market new vegetarian option to vegetarians), c) external information (e.g. market ice cream if weather is hot), d) pizza shop details (e.g. don't promote side salads if these are currently out of stock), e) special offer for callers who have been queued for a long time—(or combination of any of above).

consistent branding and standard offers.

The skilled person will be aware of a range of possible modifications of the various embodiments described above—e.g. the techniques described may be applied to other fast food outlets than pizzas, and other customer services, not just fast food delivery. For example, the techniques described may be applied to tyre and/or exhaust fitting businesses, and to a wide range of other commercial, retail and service offerings. Accordingly, the present invention is defined by the claims and their equivalents.

The invention claimed is:

1. A method of handling a telephone call within a telephone network, the method comprising the steps of:
(a) providing a multi-tenanted computer-telephony integration (CTI) server, wherein the different tenants correspond to various outlets for one or more product or service offerings, and wherein the CTI server is located within the telephone network and adapted to receive conventional telephone calls via a telephony interface, the CTI server located outside the customer premises for the various outlets;
(b) intercepting by the CTI server within the telephone network a call directed to one of the outlets, and receiving the call at the telephony interface of the CTI server;
(c) using calling line identification (CLI) for the call by the CTI server to identify the calling party and to retrieve a customer profile by matching the calling party's CLI with a previously-stored CLI in a call history database collocated with the CTI server remotely from the various outlets, wherein the customer profile is based on previous orders processed by one or more of the outlets;
(d) queuing the call at the CTI server within the telephone network if it is determined that the outlet to which the call is directed is unable to currently service the call; and
(e) forwarding the call from the CTI server over the telephone network to the outlet to which the call was originally directed to process the call;
wherein the CTI server uses the customer profile for providing priority call handling treatment comprising at least automated order status for loyal customers, wherein a customer is considered loyal at least when the customer's profile indicates the customer is a repeat caller.

2. The method of claim 1, wherein the customer profile is used to provide a marketing message dependent on the customer profile.

3. The method of claim 2, wherein the marketing message is dependent on real-time information from an external source.

4. The method of claim 3, wherein the marketing message is based on current product availability for an outlet.

5. The method of any of claim 2, wherein the marketing message is dependent on the time spent in the queue.

6. The method of any of claim 2, wherein the outlet is informed of the marketing message heard by the caller.

7. The method of claim 1, where the priority call handling treatment includes accelerating the progress of the call through a queue of calls.

8. The method of claim 1, further comprising using the CTI server for recording the call.

9. The method of claim 1, wherein the CTI server bridges the call with a call placed from the CTI server to an outlet.

10. The method of claim 1, further comprising maintaining a local copy at the CTI server of customer profile data and accessing at least one of remote order data and product availability data for handling the call.

11. The method of claim 1, further comprising providing access to aggregated statistics for all the various outlets to a managing entity.

12. Apparatus for handling a telephone call within a telephone network, the apparatus comprising:
a multi-tenanted computer-telephony integration (CTI) server, wherein the different tenants correspond to various outlets for one or more product or service offerings, and wherein the CTI server is located within the telephone network and is adapted to receive conventional telephone calls via a telephony interface, the CTI server located outside the customer premises for the various outlets;
the CTI server including a telephony interface for intercepting and receiving a call within the telephone network directed to one of the outlets, for queuing the call at the CTI server, within the network if it is determined that the outlet is unable to currently service the call, and for forwarding the call from the CTI server over the telephone network to the outlet to which the call was originally directed to process the call;

wherein the CTI server is configured to use calling line identification (CLI) for the call to identify the calling party and to retrieve a customer profile for the calling party by matching the calling party's CLI with a previously-stored CLI in a database collocated with the CTI server remotely from the various outlets, wherein the customer profile is based on previous orders processed by one or more of the outlets, and to use the customer profile for providing priority call handling treatment comprising at least automated order status for loyal customers; wherein a customer is considered loyal at least when the customer's profile indicates the customer is a repeat caller.

13. A computer readable non-transitory storage medium including machine executable instructions comprising a computer program for causing a system to perform a method of handling a telephone call within a telephone network using a multitenanted computer-telephony integration (CTI) server located within the telephone network and adapted to receive conventional telephone calls via a telephony interface, wherein the different tenants correspond to various outlets for one or more product or service offerings, and wherein the CTI server is located outside the customer premises for the various outlets, the method comprising:

(a) intercepting by the CTI server within the telephone network a call directed to one of the outlets and receiving the call at a telephony interface of the CTI server;

(b) using calling line identification (CLI) for the call by the CTI server to identify the calling party and to retrieve a customer profile for the calling party by matching the calling party's CLI with a previously-stored CLI in a database collocated with the CTI server remotely from the various outlets, wherein the customer profile is based on previous orders processed by one or more of the outlets; and (c) queuing the call at the CTI server within the telephone network to the outlet to which the call was originally directed to process the call;

wherein the CTI server uses the customer profile for providing priority call handling treatment comprising at least automated order status for loyal customers; wherein a customer is considered loyal at least when the customer's profile indicates the customer is a repeat caller.

* * * * *